May 29, 1956  G. SCHAMING  2,747,667
APPARATUS FOR PRODUCING DISKS FROM METAL BARS
Filed Jan. 7, 1953
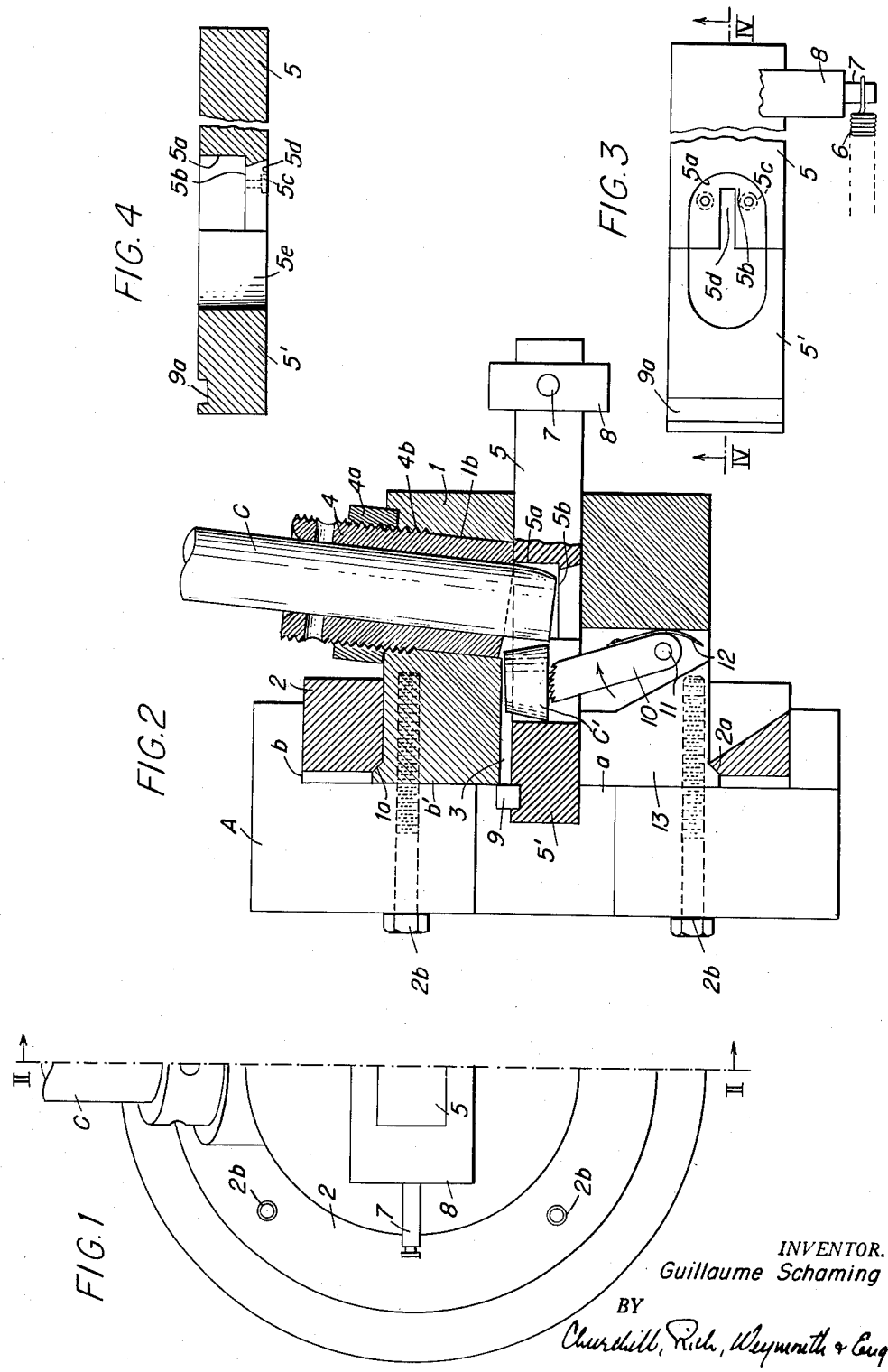
INVENTOR.
Guillaume Schaming
BY
Churchill, Rich, Weymouth & Engel
Attorneys

United States Patent Office 2,747,667
Patented May 29, 1956

2,747,667

APPARATUS FOR PRODUCING DISKS FROM METAL BARS

Guillaume Schaming, Richmond, England, assignor to Societe Schostal, Vaduz, Liechtenstein, a joint-stock company Application January 7, 1953, Serial No. 330,101

Claims priority, application Switzerland January 15, 1952

1 Claim. (Cl. 164—40)

The present invention relates to the production of disks or slugs from bars of ferrous metals, and more particularly to a method of and apparatus for producing the same.

Ordinarily these disks are obtained by sawing off the metal bars or otherwise cutting through them with a tool which removes metal, which is a relatively long operation and causes a considerable waste of material, the loss being greater in proportion as the disks are thinner.

The invention has for its objects to produce such disks and the like of uniform weight, with sound faces, in large numbers, with minimum force and without loss of material.

To this end, the bar from which the disks or slugs are to be produced is guided longitudinally and its leading end is sheared by means of a slide-block provided with a shoulder receiving the extremity of the bar, the slide-block moving in a plane which makes an angle of rake equal to about 7° with the cutting plane.

The shearing operation thus takes place in the best possible conditions, with the minimum force. The cut faces of the disk are sound by reason of the rake, and the shape of the disks is very little distorted owing to the smallness of the shearing force required.

The production output depends solely on the capacity of the press on which the shearing tool is mounted, and on the means for driving it.

Generally speaking, the bar to be cut will be inclined in relation to the direction of movement of the slide-block, the cut face of the bar remaining, however, substantially perpendicular to the axis of the bar.

In the accompanying drawings which represent, by way of illustration, the present preferred embodiment of the invention:

Fig. 1 is a half front elevation of the slug producing apparatus, the two sides of which are symmetrical;

Fig. 2 is a section taken on the line II—II of Fig. 1;

Figs. 3 and 4 show the movable part of the tool or slide-block, respectively in plan view and in section along the line IV—IV of Fig. 3.

In the embodiment represented, the shearing device is intended to be used on a horizontal press, and the bar C of material advances automatically by its own weight. The tool might, however, be mounted on a vertical press, subject to detail modifications indicated hereafter.

Referring to the drawings, the tool is mounted on a fixed part A of the press, which part has a central perforation $a$ and, upon its front face, a larger circular recess or boring $b$, concentric with this perforation. One end of a cylindrical block 1 presses upon the inner face $b'$ of this recess. This end of the block has a bevelled collar or flange 1$a$ which is engaged by the bevel 2$a$ of a ring 2 which is slipped over the block 1 and fitted into the recess $b$. Ring 2 serves to attach the tool to the press, being secured to the part A by a series of cap screws 2$b$.

The 7° angle of rake or clearance is best for softer ferrous metals. A slightly smaller angle, down to about 4°, may be used with harder ferrous metals.

The block 1 is provided with an axial hole 3, of rectangular section. Further, it is pierced with a transverse hole 1$b$, of circular section, which opens into the hole 3; the axis of this hole 1$b$ is inclined at an angle of from 83° to 86° to the axis of the block 1, depending on the metal to be cut, to give the desired rake angle referred to above and it is screw-threaded towards its outer end.

Into this second hole 1$b$ there is screwed a bushing 4 to serve as a guide for the bar C which is to be divided into disks. The bushing 4 is threaded at 4$b$ to screw into hole 1$b$ and is provided with a lock-nut 4$a$. The rim of bushing 4 has a bevel of from 4° to 7° to match the slope of hole 1$b$. This bevelled lower edge is presented obliquely in relation to the hole 3 in the block 1 and comes flush with the upper wall of said hole. The end opening of the bushing is in a plane perpendicular to the axis of the bushing.

The hole 3 serves as a guide to a slide-block 5, also of rectangular section, and made in two parts indicated as 5 and 5'. The block part 5 is subjected to the action of the ram or other moving part of the press, the block being urged back towards this moving part by a push-rod (not shown), guided within the perforation $a$ of the part A and bearing against slide-block part 5'. The slide-block 5 is maintained in contact with this push-rod by springs such as 6, attached at one end to any suitable anchorage points and at the other end to pegs 7 carried by a collar 8 upon the slide-block part 5. The return movement of the slide-block 5, effected by the push-rod, is limited by a transverse key 9, secured in a groove 9$a$ in the end of block part 5', which engages the face of block 1 in the limiting position.

The part 5 of the slide-block is the member producing the shearing of the bar C, when actuated by the moving part of the press. This part 5 is provided with a shoulder 5$a$ shaped to suit the bar to be cut and of a height corresponding to the length of the disk or piece to be cut off. This shape, for example, will be semi-circular in the case of round bars, semi-hexagonal in the case of hexagonal bars and V-shaped in the case of bars of square section. The floor 5$b$ of this shouldered portion can be pierced with holes 5$c$ for screws for the optional fixing of applied shims or packing pieces, intended to vary the length of the disks or pieces to be cut off. This floor 5$b$ contains a slot 5$d$ allowing passage of a pawl 10 for temporarily retaining the cut off pieces. The other part 5' of the slide-block receives the thrust of the above-mentioned push-rod, acting as an extractor, for bringing back the slide-block 5 to its starting point; this part 5' comprises a cavity 5$e$ which allows passage of the pawl 10 and of the cut-off disks or lengths of the rod C.

The pawl 10 is pivoted on a transverse pin 11 across a slot below the hole 3 of the block 1; the pawl is controlled by a leaf spring 12 urging it toward bar C. In front of this pawl, the block 1 is pierced with a wide passage 13 communicating with an aligned opening in ring 2, which places the hole 3 in downward communication with the exterior.

With the tool in the position shown in Fig. 2, and the extremity of the bar C resting upon the floor 5$b$, when the press plunger pushes in the slide-block 5, 5', the upper edge of its shoulder 5$a$ engages the bar, and the latter becomes sheared between that edge and the opposite edge of the bushing 4, this shearing cut having the desired angle of rake.

When the slide-block 5, 5' moves back as the plunger retires, the cut off disk C' being retained by the pawl 10, cannot follow the return movement of the slide-block. This disk will be freed on the next stroke of the plunger, by the advance of a fresh disk, which in its turn will be retained by the pawl 10. The disks or parts cut off fall out of the cavity 5e in slide-block part 5' and through the passage 13.

The length of the pawl 10 will depend upon the thickness of the disks to be cut off. In order to change this thickness, the shims or packing pieces, referred to above, can be applied upon the floor 5b of slide-block part 5. However, for very small variations of thickness, the bushing 4 can be unscrewed, so as to create a slight clearance between it and the slide-block, without any disadvantage, because the lower end of the bushing is symmetrical relative to its axis. Of course, it is necessary to have a special bushing 4 and a special slide-block 5 for every diameter of bar C to be cut up. The opening through the bushing should also conform to the shape of the bar, i. e. a square hole for a square bar etc.

In order to adapt the tool for use on a vertical press, it is only necessary to omit the part 5' of the slide-block, the push-rod mentioned being dispensed with inasmuch as the disks or parts C' cut off will pass from the hole 3 in the block 1, through the perforation a in the part A and the push-rod guide, viz. the table of the press.

The remaining part 5 of the slide-block will then have to be fixed to the plunger or other moving part of the press, the stroke being regulated according to the movement to be given to the tool.

Disks or slugs produced as above described are used for the forming of a variety of articles by cold forming methods and their utility will be understood by those familiar with the art.

The invention is not to be limited to the foregoing illustrative example but is to be construed in accordance with the appended claim.

What I claim is:

Apparatus for the production of disks or slugs of uniform weight from ferrous metal bar stock comprising, in combination, a fixed block, an opening therethrough, a slide-block slidably mounted in said opening, means for reciprocating said slide-block, said slide-block having a shoulder forming with an external face thereof a shearing edge conforming, when in contact with the bar, to the shape of an exterior portion of the bar to be cut throughout the extent of said cutting edge, a bar-supporting floor in said slide-block spaced from said edge to determine the length of stock to be cut, an externally threaded guide bushing for said bar stock extending through a threaded opening in said block whereby it may be longitudinally adjusted by rotation therein, said bushing having a bore shaped to closely surround the bar stock and having an end face adjacent said shearing edge and having an end opening in said end face lying in a plane perpendicular to the longitudinal axis of the bushing, the plane of said end face making a rake angle of from about 4° to 7° with the plane of movement of said shearing edge on said slide-block.

References Cited in the file of this patent
UNITED STATES PATENTS

| | | |
|---|---|---|
| 1,075,439 | Quinlin | Oct. 14, 1913 |
| 1,826,016 | Naylor et al. | Oct. 6, 1931 |
| 1,986,633 | Hearing | Jan. 1, 1935 |
| 1,992,537 | McNair | Feb. 26, 1935 |
| 2,364,334 | Wold | Dec. 5, 1944 |
| 2,428,540 | Babbitt et al. | Oct. 8, 1947 |